US012807100B2

(12) United States Patent
Erwin et al.

(10) Patent No.: US 12,807,100 B2
(45) Date of Patent: Nov. 24, 2026

(54) DEVICE FOR REVVING A VEHICLE ENGINE

(71) Applicant: BG Intellectuals, Inc., Wichita, KS (US)

(72) Inventors: Michael Jason Erwin, Augusta, KS (US); Bradley Robert Young, Wichita, KS (US); Stephen Marvin Pederson, Wichita, KS (US); Zachary Adam Dold, Wichita, KS (US)

(73) Assignee: BG Intellectuals, Inc., Wichita, KS (US)

( * ) Notice: Subject to any disclaimer, the term of this patent is extended or adjusted under 35 U.S.C. 154(b) by 316 days.

(21) Appl. No.: 18/382,916

(22) Filed: Oct. 23, 2023

(65) Prior Publication Data

US 2024/0132025 A1 Apr. 25, 2024
US 2024/0227741 A9 Jul. 11, 2024

Related U.S. Application Data

(60) Provisional application No. 63/418,330, filed on Oct. 21, 2022.

(51) Int. Cl.
*B60S 5/00* (2006.01)
*F15B 15/14* (2006.01)

(52) U.S. Cl.
CPC ................ *B60S 5/00* (2013.01); *F15B 15/14* (2013.01); *F15B 15/149* (2013.01)

(58) Field of Classification Search
CPC ........................................................ B60S 5/00
See application file for complete search history.

(56) References Cited

U.S. PATENT DOCUMENTS 5,411,321 A * 5/1995 Harness ................ B60T 17/223
74/532
5,809,833 A 9/1998 Newport et al.
5,991,674 A 11/1999 Froelich et al.
(Continued)

FOREIGN PATENT DOCUMENTS

| | | | |
|---|---|---|---|
| FR | 2793204 | A1 | 11/2000 |
| FR | 2893550 | A3 | 5/2007 |
| KR | 10-1773836 | B1 | 9/2017 |

OTHER PUBLICATIONS

Actuonix Motion Devices—10 Different Options For Controlling Linear Actuators (https://web.archive.org/web/20170606084322/http://blog.actuonix.com/2017 /05/10-different-options-for-controlling.html, posted May 4, 2017) (Year: 2017).
(Continued)

*Primary Examiner* — Walter L Lindsay, Jr.
*Assistant Examiner* — Andrew V Do
(74) *Attorney, Agent, or Firm* — Shook, Hardy & Bacon L.L.P.

(57) ABSTRACT

Revving an engine may be helpful in various contexts, such as when servicing the vehicle. For example, in some types of services, a cleaning agent may be introduced into the intake and surrounding regions of an engine, and the engine may be revved to reduce a likelihood that the cleaning agent might puddle. In some instances, a device can be positioned within a vehicle interior and can be used to automatically rev the vehicle engine by depressing on the vehicle throttle.

19 Claims, 7 Drawing Sheets

(56) References Cited

U.S. PATENT DOCUMENTS

| | | | |
|---|---|---|---|
| 6,632,506 | B1 | 10/2003 | Grall |
| D517,105 | S | 3/2006 | Negishi |
| D546,252 | S | 7/2007 | Belisle |
| D571,291 | S | 6/2008 | Jabaji |
| D653,182 | S | 1/2012 | Hatano et al. |
| 8,939,043 | B2 | 1/2015 | Winther et al. |
| 9,109,696 | B2 | 8/2015 | Heurich et al. |
| 9,312,738 | B2 | 4/2016 | Winther et al. |
| 9,886,053 | B1 | 2/2018 | Buse et al. |
| 10,309,504 | B2 | 6/2019 | Wang |
| D925,631 | S | 7/2021 | Knudsen |
| D966,159 | S | 10/2022 | Hynd |
| 11,752,867 | B2 | 9/2023 | Erwin et al. |
| 2008/0048514 | A1 | 2/2008 | Hoffmann et al. |
| 2011/0100105 | A1 | 5/2011 | Bauerle et al. |
| 2012/0187358 | A1 | 7/2012 | Lee |
| 2013/0226394 | A1 | 8/2013 | Amirpour et al. |
| 2015/0336557 | A1 | 11/2015 | Mcneil, Sr. |
| 2019/0135260 | A1 | 5/2019 | Graves |
| 2020/0324650 | A1 | 10/2020 | Erwin et al. |
| 2021/0318711 | A1 | 10/2021 | Camacho et al. |

OTHER PUBLICATIONS

Final Office Action received for U.S. Appl. No. 29/857,480, mailed on Sep. 5, 2024, 8 pages.
Non-Final Office Action received for U.S. Appl. No. 29/857,480, mailed on Feb. 16, 2024, 8 pages.

* cited by examiner

DEVICE FOR REVVING A VEHICLE ENGINE

CROSS-REFERENCE TO RELATED APPLICATIONS

This application claims priority to U.S. Provisional Application No. 63/418,330 (filed Oct. 21, 2022), which is incorporated herein by reference in its entirety.

TECHNICAL FIELD

This disclosure relates to a device that revs a vehicle, such as when the vehicle is being serviced.

BACKGROUND

During induction services for an engine, an agent (e.g., liquid cleaner) can be introduced through an intake and moved or flowed across different engine components. For example, the engine may be revved to propel the agent across cylinders. Proper revving (e.g., every 45 seconds for 25 to 40 minutes) may improve the effectiveness of the service and avoid negatively impacting performance of the engine (e.g., such as by avoiding negative issues associated with hydrolocking).

BRIEF DESCRIPTION OF THE DRAWINGS

The subject matter of this disclosure is described in detail herein with reference to the figures that are listed directed below and that are incorporated herein by reference. These figures are submitted together with this disclosure.

DETAILED DESCRIPTION

Figure 1:
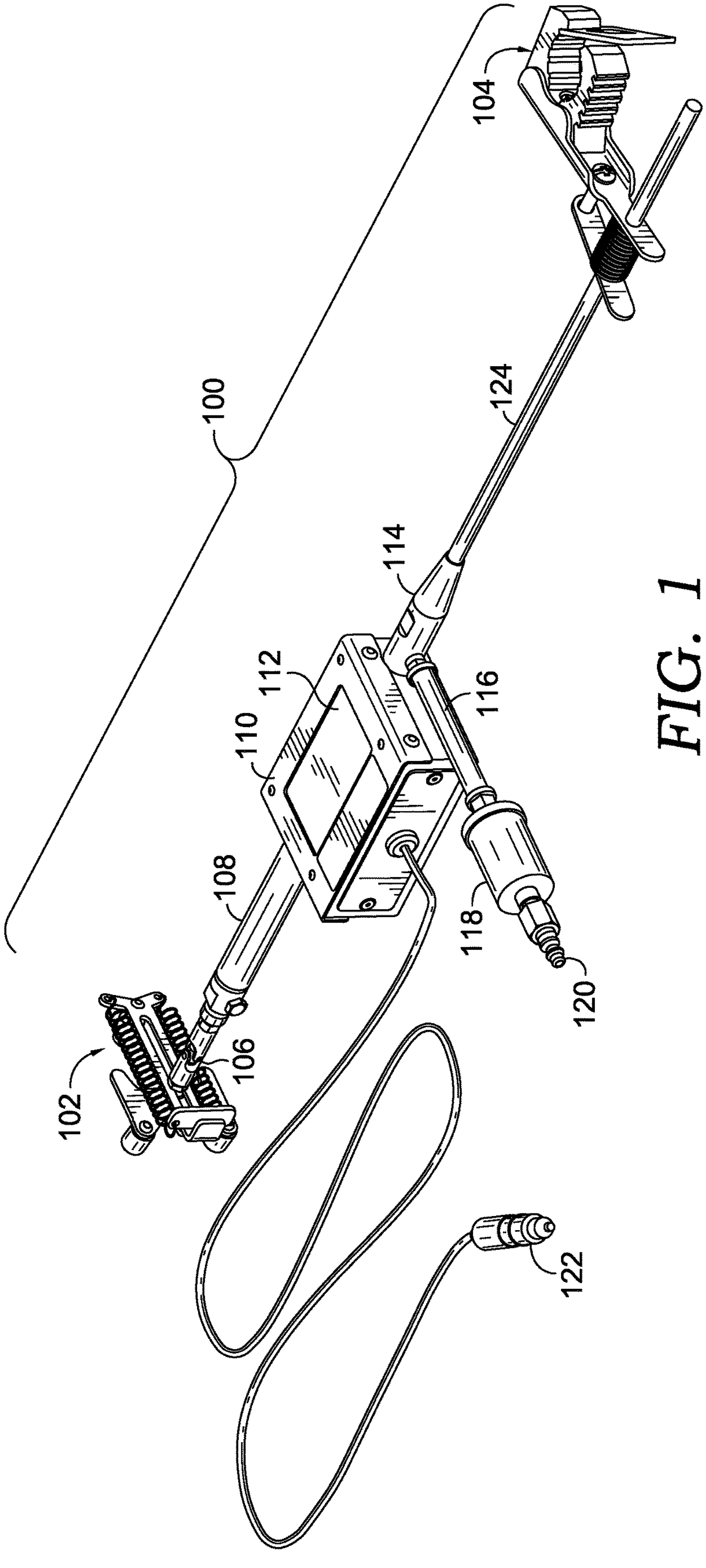
FIG. 1 depicts an example tool or device for revving an engine, based on an example of this disclosure.

At a high level, this disclosure describes a tool or device that revs a vehicle engine, such as when the vehicle is being serviced. That is, the vehicle may include a propulsion system (e.g., an internal combustion engine, hybrid electric power system, an all-electric engine, and/or another propulsion system type) connected to a drive train of the vehicle. The propulsion system may be controlled in response to receiving signals from various sources, such as a manually-controlled, pedal-type throttle/accelerator. In one aspect of the present disclosure, the engine revving device may be positioned within a vehicle interior and used to automatically rev the vehicle engine by pressing the vehicle throttle pedal.

As used in this disclosure, the terms "rev" or "revving" refers to the operation of temporarily activating a throttle (e.g., depressing vehicle gas pedal) and then deactivating the throttle to allow the throttle to return to an original (e.g., at-rest) position. When revving is manually performed by a shop technician depressing a vehicle gas pedal, the revving can limit the shop technician's ability to perform other tasks and is prone to human error. Furthermore, as used in this disclosure, the term "auto-revving" refers to a situation in which a non-human operator executes the activation of, and deactivating of, the pedal. Auto-revving includes a partially-automated system, such as where a human operator (e.g., shop technician) may operate a switch, which triggers activation of the throttle, as well as a fully-automated system in which the device is fully programmable (e.g., at one or more set intervals) to execute the throttle activation without a human operator controlling the trigger.

In some examples, a shop technician might use a control unit to program the duration and frequency of the auto-revving. In some examples, the control unit can be pre-programmed or pre-set. In addition, via the control unit, an operator may select one or more options to customize or tailor operations of the device for a given vehicle or service type. Auto-revving may be executed in various scenarios, such as when the vehicle is being serviced. For example, in some types of services, a cleaning agent may be introduced into the intake and surrounding regions of an engine, and the engine may be revved to reduce a likelihood that the cleaning agent might puddle. Absent subject matter of this disclosure, a shop technician might sit in the vehicle and manually rev the vehicle at selected intervals. As such, the subject matter of this disclosure improves efficiency and effectiveness of the service by permitting the revving to occur at more precisely controlled intervals and by freeing a human shop technician to perform other tasks.

As used herein, the terms "about" and "substantially" mean+/−10% of a given value, such as a linear dimension value (e.g., height, width, etc.) or a weight value. In addition, with respect to an angle or angular dimension, or the terms parallel and perpendicular, the terms "about" and "substantially" mean within 10 degrees. If the "about" or "substantially" is otherwise used, the terms include equivalents of the subject element, where appropriate.

Figure 6:
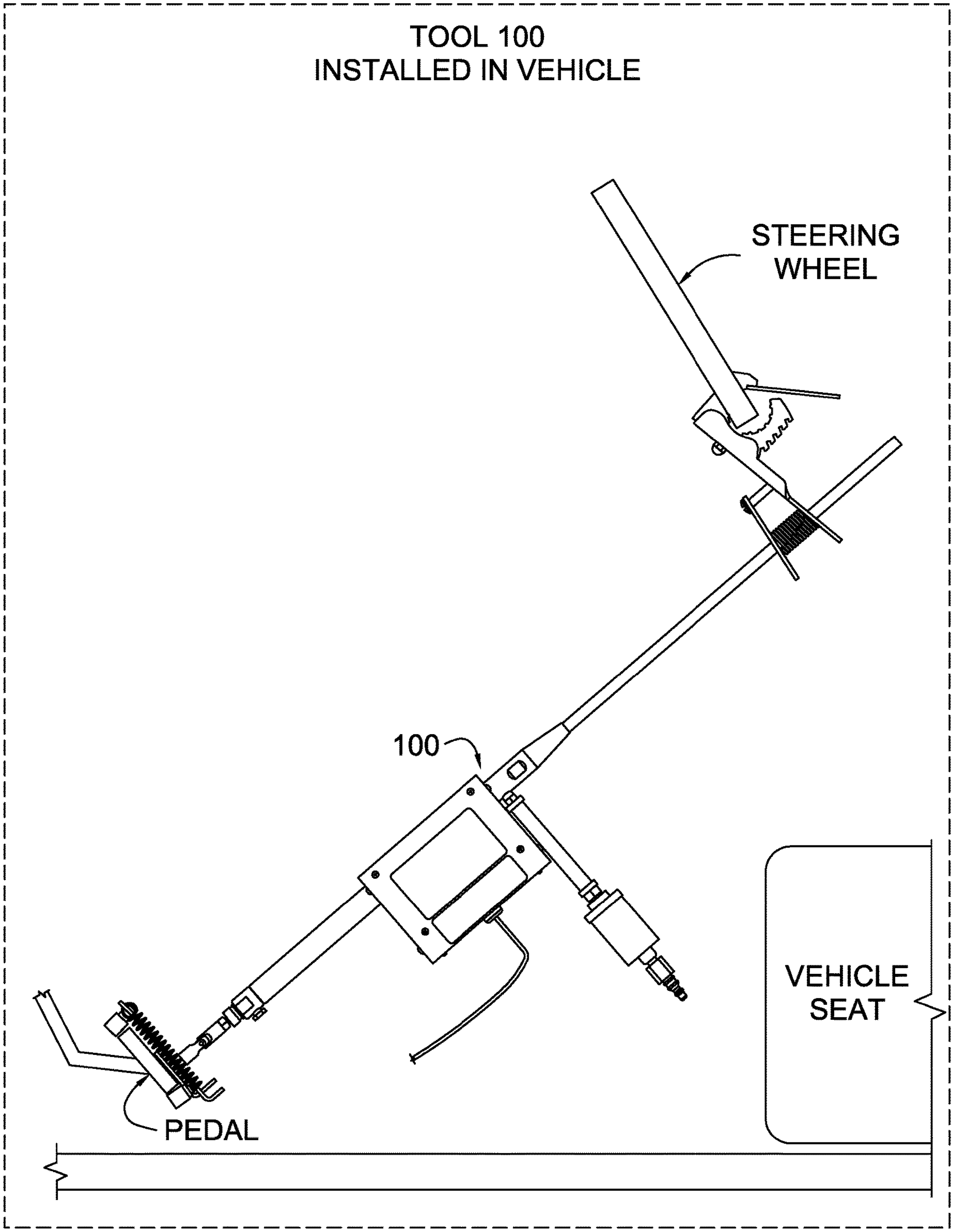
FIG. 6 depicts an example of a tool of the present disclosure installed in a vehicle.

Referring now to FIG. 1, an example engine revving device 100 is depicted, and for illustrative purposes, the engine revving device 100 is shown uninstalled (e.g., FIG. 6 shows an example of the tool installed in a vehicle). In an aspect of this disclosure, the engine revving device 100 generally includes a pedal clamp assembly 102, a linear actuator 108 (e.g., pneumatic), a steering wheel connector or clamp 104, and a linear-actuator control unit 112. At a high level, the pedal clamp assembly 102 is attachable to a throttle pedal of a vehicle. The pedal clamp assembly 102 is coupled (e.g., via a U-joint 106 that can swivel) to the linear actuator 108.

In examples of the present disclosure, the linear actuator 108 is coupled to the steering wheel clamp 104 by a series of in-line connections and components. These connections and components function together to provide a relatively rigid assembly that can efficiently transfer force from the linear actuator 108 to the pedal clamp assembly 102 and then to a connected pedal of a vehicle. That is, when the steering wheel clamp 104 is coupled to a steering wheel, and the linear actuator 108 is activated, a position of the steering wheel clamp 104 can remain fixed, such that the force applied by the linear actuator 108 can operate to move a pedal to which the pedal clamp assembly 102 is affixed. For example, the linear actuator 108 can be coupled to the steering wheel clamp 104 via a junction box 110, the air coupler 114, and an elongated rigid member 124 (e.g., rod). The steering wheel clamp 104 is affixed at one end of a rigid rod 124.

In at least some examples, the linear-actuator control unit 112 is housed within the junction box 110. The linear-actuator control unit 112 can include various components configured to control an operation of the linear actuator 108, such as pressure regulator(s), valve(s), solenoid(s), touch-screen or other input device, etc., and these components can operate together to control operations of the linear actuator 108 when transitioning between a retracted state and an extended state. Again, because the steering wheel clamp 104 fixes the relative position of the engine revving device 100 inside the vehicle, when the linear actuator 108 moves to the extended state, the pedal clamp assembly 102 in-turn depresses the throttle pedal to rev the vehicle engine. When the linear actuator 108 is deactivated (e.g., retracted), the throttle pedal returns to the original (e.g., at rest) position.

Figure 2:
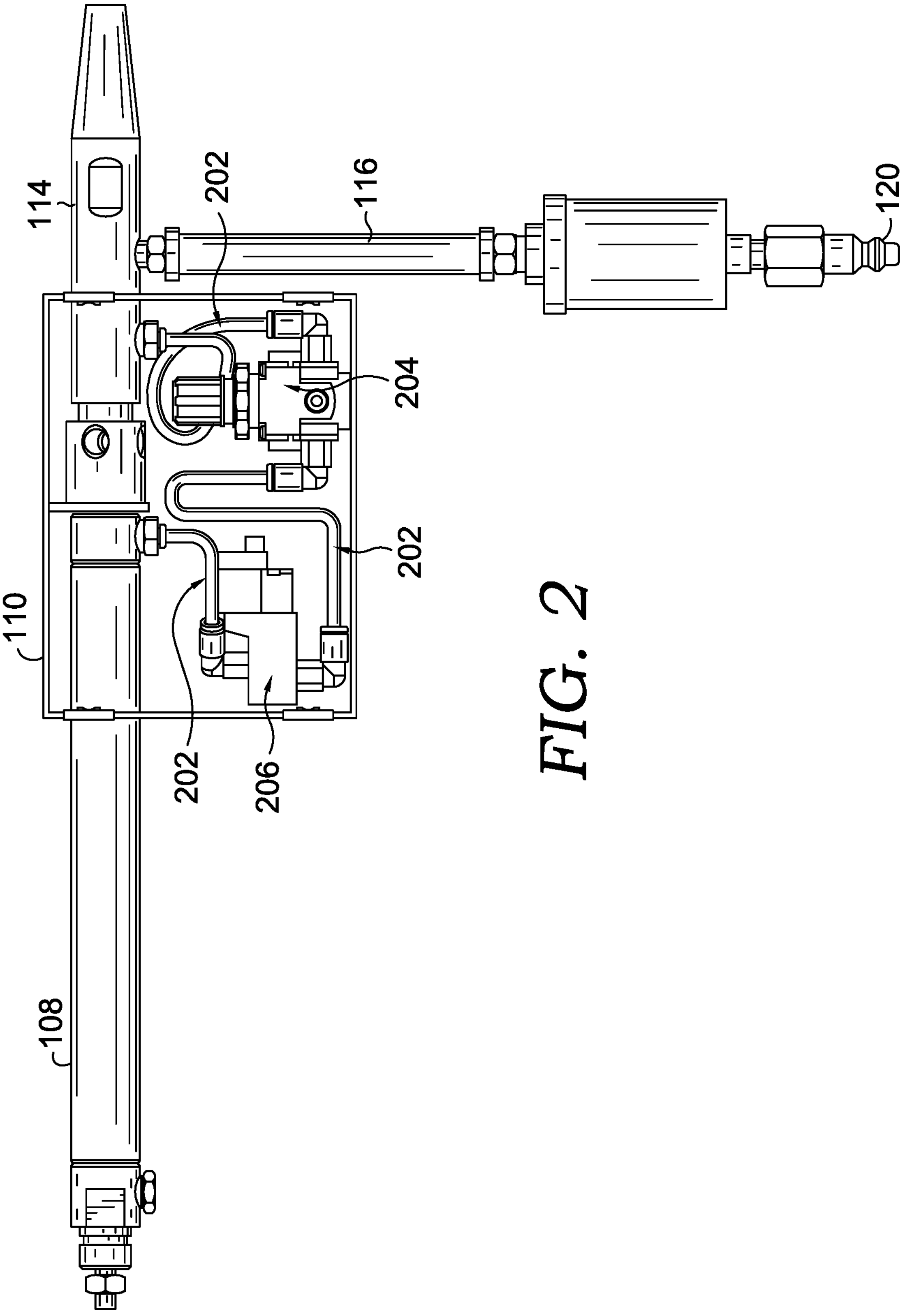
FIG. 2 depicts a portion of the tool or device in FIG. 1, and shows some elements inside a junction box.

Referring now to FIG. 2, various components associated with the junction box 110 and the air coupler 114 are depicted, based on an example. In at least some instances, a flexible hose whip 116 (e.g., 4" hose whip) is affixed between the air coupler 114 and the pressurized air coupling 120 (e.g., a quick-connect style coupling). In examples, a water/oil separator 118 can also be affixed in-line and after (downstream of) the pressurized air coupling 120 (e.g., between the pressurized air coupling 120 and the hose whip 116). In examples, the hose whip 116 allows air pressurized air coupling 120 to bend away from the engine revving device 100 while remaining in an upright angled position. This movement can allow for the junction box 110 to sit lower to the floorboard as required for some vehicles. Stated differently, when the pedal clamp assembly 102 is affixed to a pedal and the steering wheel clamp 104 is affixed to a steering wheel, and when the device 100 is being coupled to a pressurized air source, the junction box 110 can remain in a desired orientation and just the hose whip 116 can be flexibly bent (e.g., outward) to connect the coupling 120 to the air source. In some examples, the engine revving device 100 can be used with shop air (e.g., by attaching the shop air to a pressurized air coupling 120) and other equivalent sources of air and power could also be used.

Figure 3:
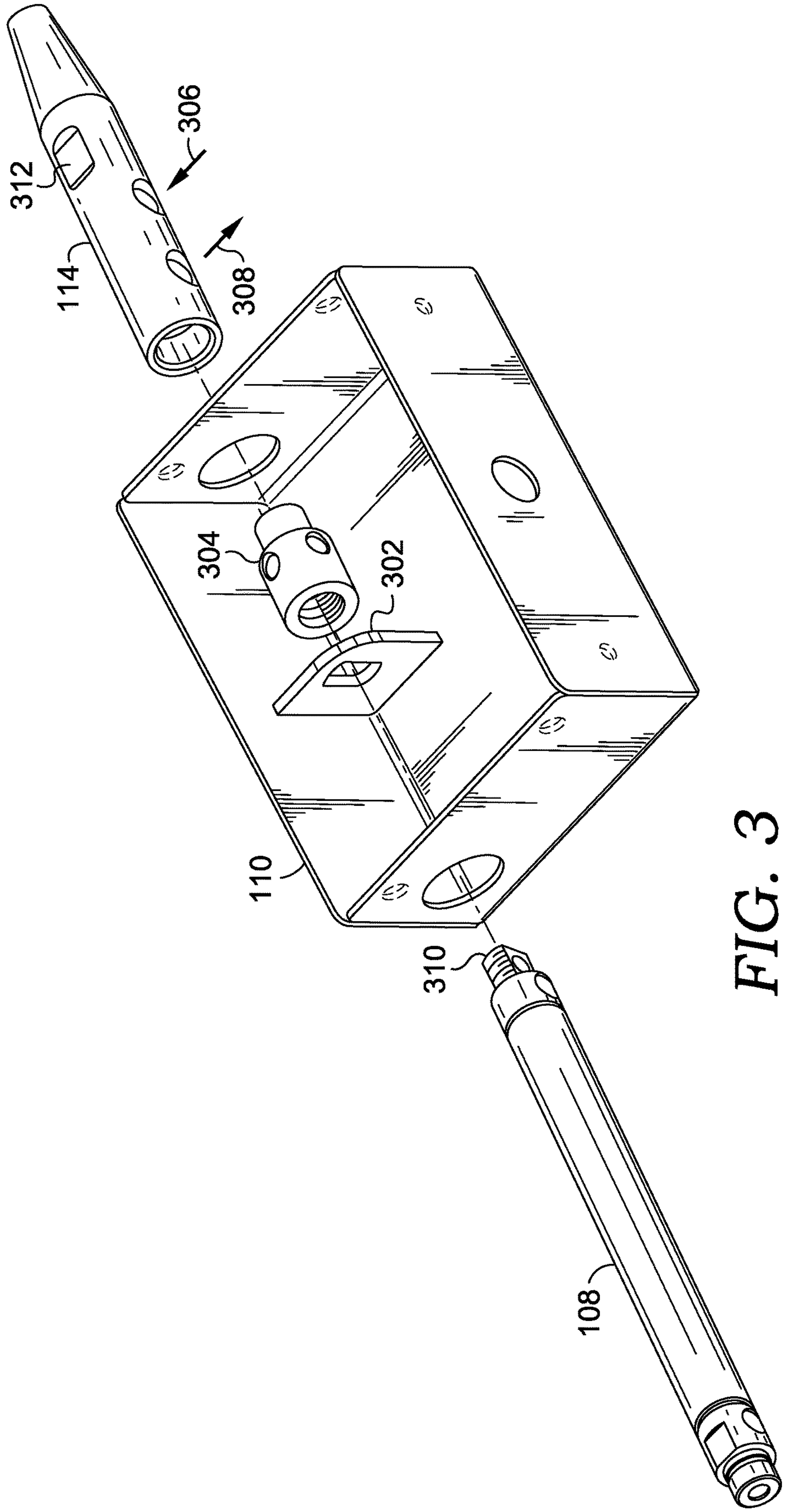
FIG. 3 depicts some of the elements of the tool or device in a disassembled view.

In examples, the hose whip 116 attaches (e.g., at the downstream end of the hose whip) to the air coupler 114, which operates as a conduit to allow pressurized air to flow into the junction box 110 (e.g., into components contained within the junction box 110). For example, the air coupler 114 includes an input/inlet port 306 (FIG. 3), which connects to the hose whip 116, and an output/outlet port 308. In addition, the air coupler 114 includes an opening or channel (e.g., at least a portion of the air coupler 114 is hollow) that fluidly couples the input port 306 to the output port 308.

In examples, the air coupler 114 extends through a through hole (e.g. FIG. 3) in a side of the junction box 110, such that the input/inlet port 306 is outside the junction box 110, whereas the output/outlet port 308 is inside the junction box 110. As such, the air coupler 114 operates to port the pressurized air from outside the junction box 110 to inside the junction box 110 (e.g., to the components inside the junction box 110).

In at least some examples, one or more hoses are arranged inside the junction box 110 to communicate and flow the pressurized air to one or more subsequent in-line (or parallel) components. For example, inside the junction box 110 (e.g., FIG. 2), the outlet port 308 can attach to an air hose 202 inside the junction box 110, which can transport the air to a pressure regulator 204 and solenoid 206, before eventually passing to the linear actuator 108. The regulator 204 can help to control a pressure of the air, and the solenoid 206 (e.g., powered by the power source connected to the 12V plug 122 or the plug 406 in FIG. 4B) can help to selectively communicate the air to the linear actuator 108 (e.g., based on input from the linear-actuator control unit 112). In examples, the pressure regulator 204 can be pre-set during assembly to a desired pressure (e.g. 40 psi) allowing the engine revving device 100 to operate consistently with a variety of different input pressures. The regulated air can then flow to the solenoid 206, which is controlled by the linear-actuator control unit 112. The operational state of the solenoid (e.g., as determined by the control unit) can then control the state of the linear actuator 108, which in turn can depress or release the vehicle pedal. The engine revving device 100 does not require any additional tools to operate, and in some examples, a max air pressure is 140 psi.

The control unit 112 that is housed within the junction box 110 and that can control operations of the pressure regulator 204, the solenoid 206, etc. can include various components, such as a programmable controller. In examples, the programmable controller can include a timer that is programmable to set one or more predetermined intervals. For example, the programmable controller might include a programmable logic controller, or other computing device, to permit programmatic control of the timer. As such, the control unit 112 can be programmed to selectively and temporarily open or close the solenoid 206 at predetermined intervals, which in turn temporarily actuates the linear actuator 108 to depress or release the vehicle pedal. For example, when a vehicle is undergoing some types of services (e.g., induction cleaning service), it might be desirable to rev the engine about every 45 seconds. This is just an example, and the timer can be selectively programmed to include different intervals based on the service or use of the throttle depressor.

In examples, using the control unit 112, the intervals associated with actuation of the linear actuator 108 can be programmed. For example, the intervals may be set to rev every "x" seconds, where "x" is about 25 seconds, about 30 seconds, about 35 seconds, about 40 seconds, about 45 seconds, about 50 seconds, about 55 seconds, or about 60 seconds. In addition, each cycle can be programmed to rev the engine "n" number of times (e.g., "n" times in relatively quick succession every "x" seconds, such as 3 times in relatively quick succession every 45 seconds). In some examples, the control unit 112 can be used to specify (by the operator or service technician) the dwell time for each pedal depression. For example, the dwell time (e.g., the amount of time the linear actuator is moved in a direction to cause the pedal to be depressed) can be set at a time duration between about 0.1 seconds and 1.0 seconds (e.g., about 0.1 seconds, about 0.2 seconds, about 0.3 seconds, about 0.4 seconds, about 0.5 seconds, about 0.6 seconds. about 0.7 seconds, about 0.8 seconds, about 0.9 seconds, and about 1.0 seconds). FIG. 1 illustrates a touchscreen on the front of the control unit 112, and in examples, the touchscreen can be used to provide inputs to the control unit 112.

The control unit 112 can be configured to automatically adjust the one or more set intervals in response to receiving the input data. The one or more set intervals may be adjusted in response to various data, including any metrics that might be broadcast by the vehicle over the OBD2 sensor or through other means (e.g., RPM, temperature, current gear, run time, or any and all combinations thereof). In other words, the tool 100 may execute a first revving cycle at a first interval (e.g., 45 seconds), and the control unit 112 may adjust the subsequent timing of a second revving cycle based on data received from the vehicle-diagnostics system. The control unit 112 might adjust the time between cycles, the duration of linear-actuator activation and pedal depression, the extent to which the solenoid valve is opened, or any combination thereof.

Various additional components can contribute to the in-line and rigid assembly associated with the device 100. For example, and referring to FIG. 3, the air coupler 114 can extend through a through hole in a side of the junction box 110 and attach to an adapter 304, which joins the air coupler 114 to the linear actuator 108. In examples, the adapter 304 threadably attaches to the air coupler 114 (although threads are not illustrated in FIG. 3). The air coupler 114 can, in some instances, rotate (e.g., spin relative to a longitudinal axis) relative to the adapter 304, while still remaining attached to the adapter 304. In some examples, a threaded connection 310 associated with the linear actuator 108 is keyed to slot in a slotted divider gusset 302 that is housed inside the junction box 110. For example, the threaded connection 310 can include one or more flat sides (or other non-circular portions), which create a cross-sectional profile that corresponds with a shape of the slot in the divider gusset 302. As such, the threaded connection 310 can insert into the slot of the slotted divider gusset 302, and the divider gusset 302 can hold the threaded connection in position (e.g., impede the threaded connection 310 from rotating), such as when the adapter 304 is being threadably coupled to the threaded connection 310.

In at least some examples, the linear actuator 108 may or may not rotate relative to the threaded connection 310. However, the linear actuator 108 can in some examples, still rotate, relative to the pedal clamp assembly 102, based on the U-joint 106, and the linear actuator 108 can rotate, relative to the air coupler 114 based on the rotatable connection between the adapter 304 and the air coupler 114. As such, the linear actuator 108 and junction box 110 can include a relatively fixed connection (to each other), whereas the other components (e.g., pedal clamp assembly 102 and air coupler 114) can rotate to allow components to be arranged and positioned in a desired orientation.

Figure 4A:
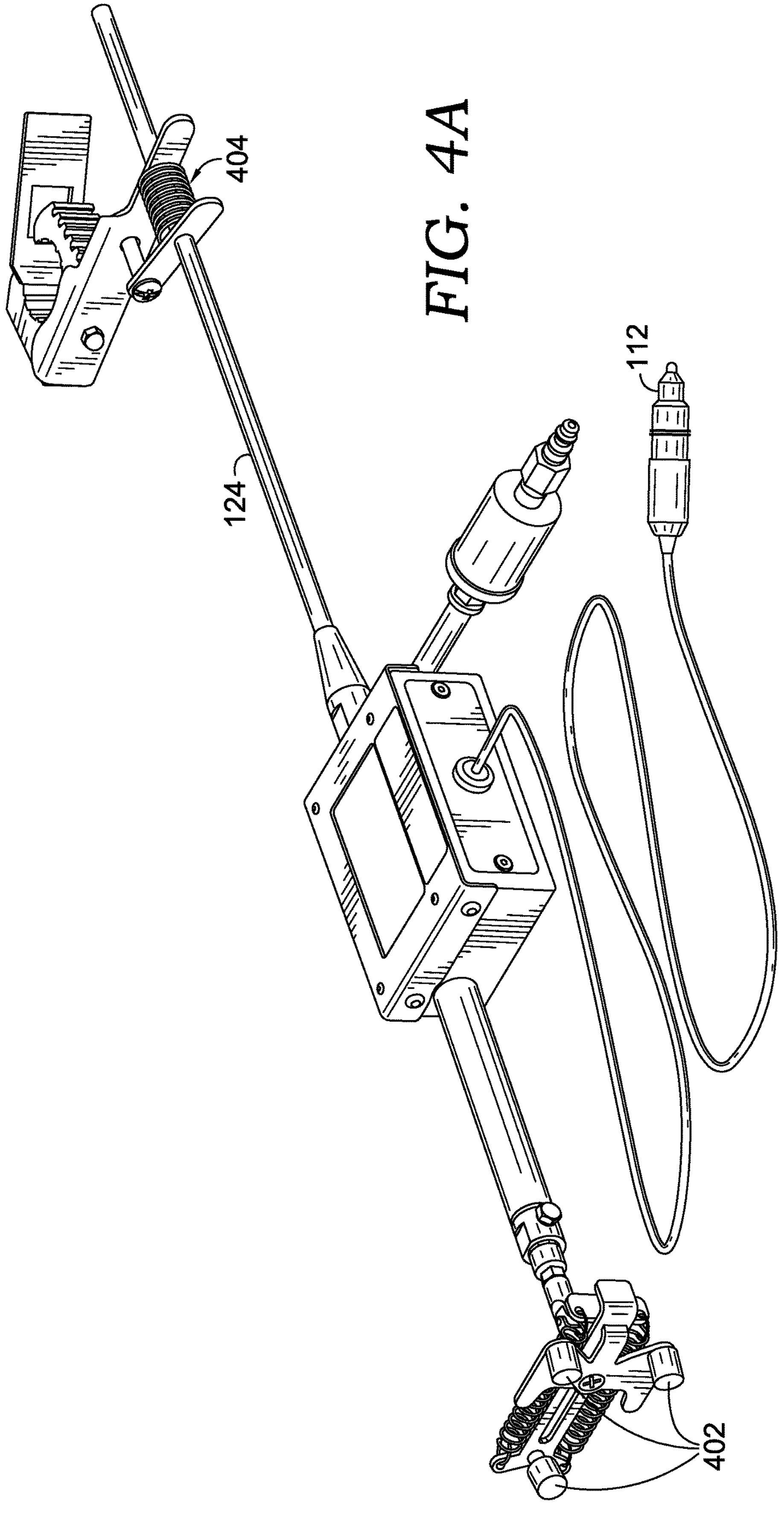
FIG. 4A depicts the tool from another angle.
Figure 4B:
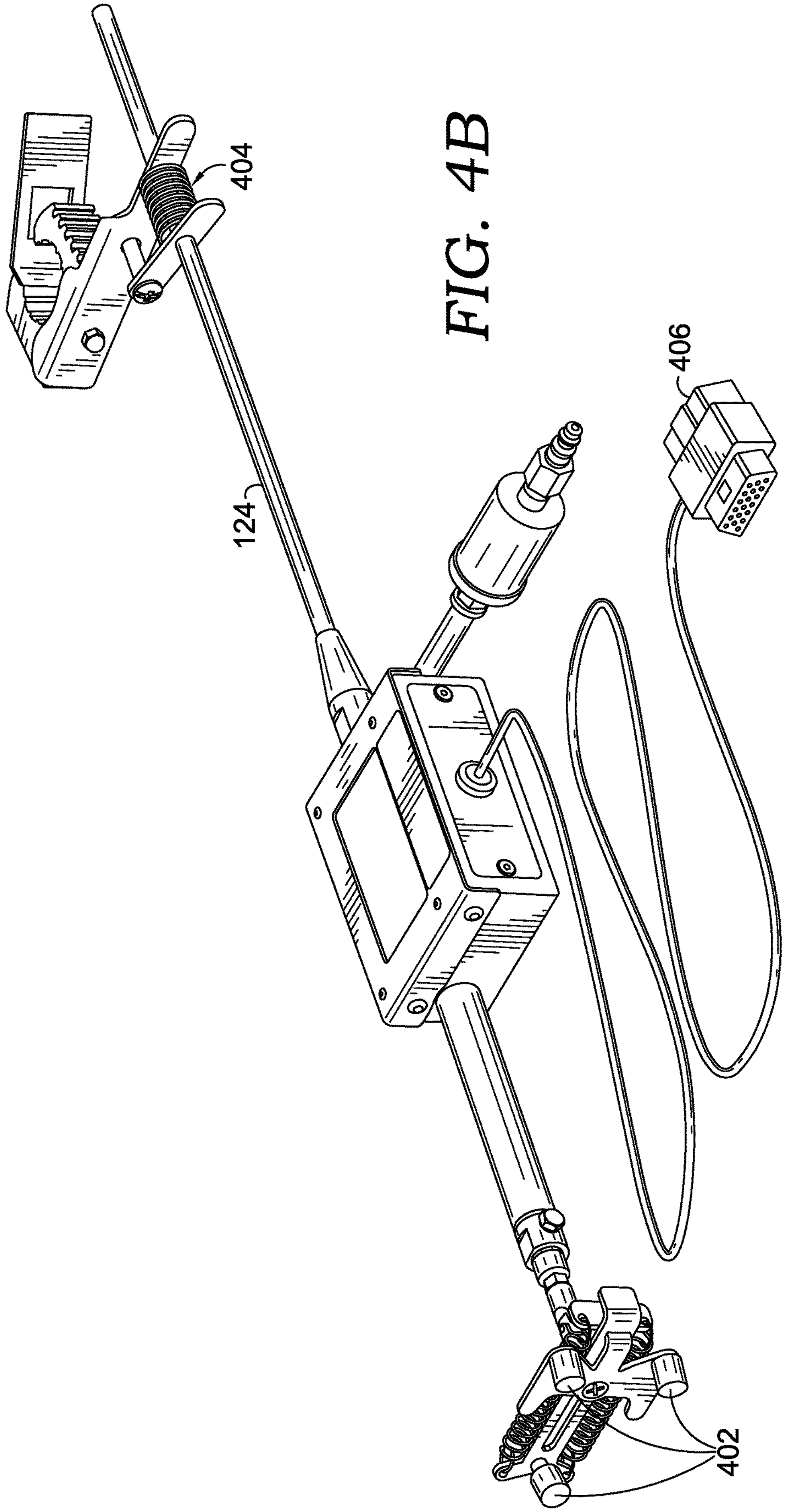
FIG. 4B depicts another example, in which the tool can include a different power source plug than shown in FIG. 4A.

Referring now to FIG. 4A, the pedal clamp assembly 102 includes adjustable grips 402. In examples, the adjustable grips 402 are associated with a spring-loaded mechanism, which allows the user to easily clamp the grips 402 onto a variety of different sizes and shapes of accelerator pedals. In examples, the u-joint 106 swivels and allows the pedal clamp assembly 102 to spin or rotate relative the linear actuator 108, which can allow the various parts of the tool 100 to be independently rotated to a desired position (e.g., downward). In addition, based on the pivotable nature of the u-joint 106, once the pedal clamp assembly 102 is attached to the accelerator pedal via the adjustable grips 402, the u-joint 106 allows for the engine revving device 100 to be installed at different angles to accommodate a variety of vehicles (e.g., steering wheels at different heights relative to the pedal). Furthermore, once the pedal clamp assembly 102 is attached to the accelerator pedal, the steering wheel clamp 104 can be adjusted up or down on the rigid rod 124 and fastened to the steering wheel (e.g., via the clamp position adjuster 404). In some embodiments, after the engine revving device 100 is affixed in a relative position inside the vehicle via the steering wheel clamp 104 and the pedal clamp assembly 102, a power cord (e.g., the 12V plug 122) can be plugged into a source (e.g., into a 12V port in the vehicle). In other embodiments, the engine revving device 100 can be equipped with an on-board diagnostics plug 406 (e.g., FIG. 4B), which can plug into the vehicle and serve as the power source for the engine revving device 100 to operate.

Figure 5:
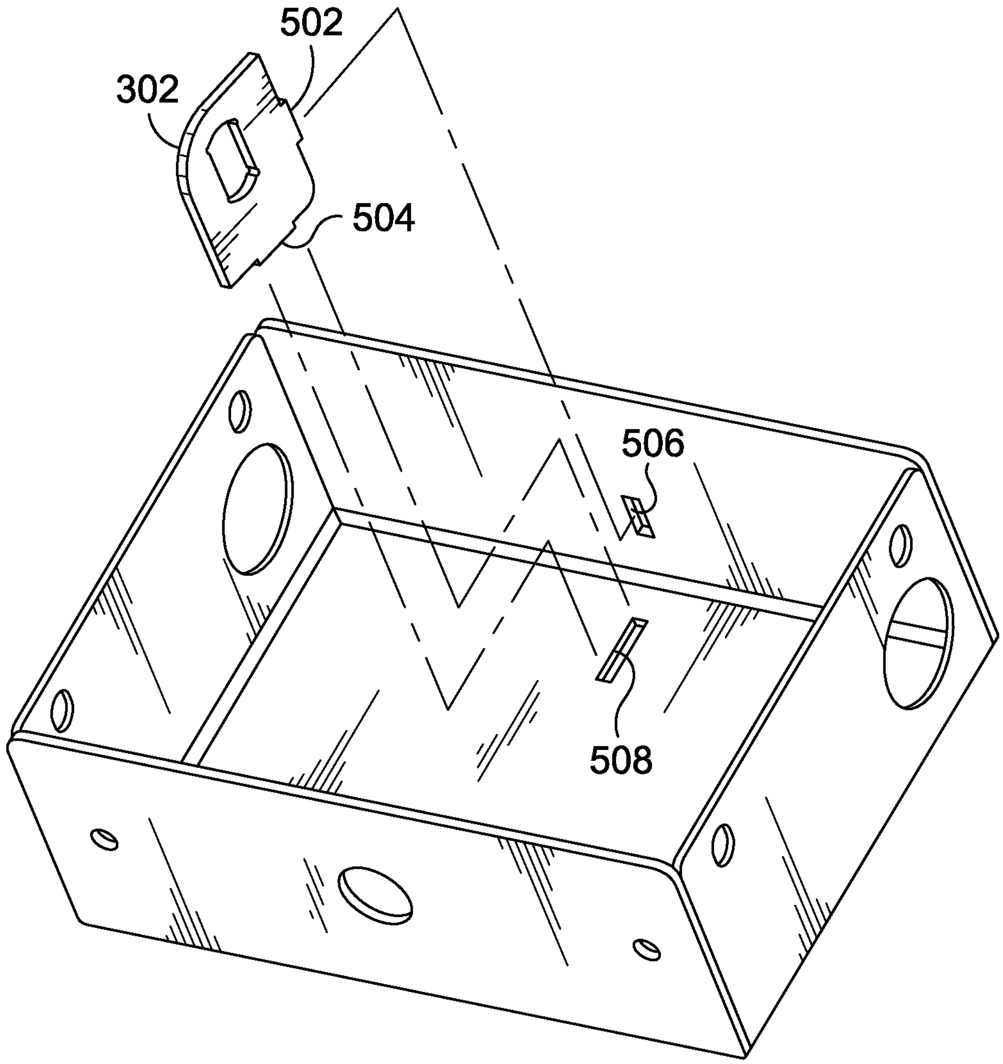
FIG. 5 depicts the junction box with a slotted divider gusset.

In some examples, referring now to FIG. 5, the slotted divider gusset 302 has two different sized matting tabs (e.g., a mating Tab A 502 and a mating Tab B 504) on it that fit into corresponding slots (e.g., Slot A 506 and Slot B 508, respectively) on the junction box 110 and allow for the divider gusset 302 to be self-fixturing and always be assembled and welded correctly. For example, the larger Tab B 504 won't fit into Slot A 506, because the Slot A 506 is meant to be mated with the smaller Tab A 502. This configuration, where each of the two tabs has a corresponding slot, reduces the likelihood that the slotted divider gusset 302 is assembled in the wrong orientation. In addition, the welded tab (e.g., the tab after Tab A 502 is matted with Slot A 506 and subsequently welded and Tab B 504 is matted with Slot B 508 and subsequently welded, affixing the slotted divider gusset 302 to the junction box 110) is centered in the junction box 110 to allow the junction box 110 to be installed in either direction, allowing for the engine revving device 100 to be used in both left- and right-hand drive vehicles.

As described in other portions of this disclosure, the engine revving device 100 can include various features. The pedal clamp assembly 102 with adjustable grips 402 of the engine revving device 100 allows the user to connect it to a variety of different sized accelerator pedals (e.g., an example of the device 100 installed is depicted in FIG. 6). The swivel u-joint 106 connecting the pedal clamp assembly 102 to the linear actuator 108 allows the engine revving device 100 to move at more angles and work with a variety of different vehicles. The engine revving device's 100 industrial pressurized air coupling 120, inline water/oil separator 118, and regulator 204 allow for the engine revving device 100 to be used with a variety of different inputs and still function consistently. The flexible hose whip 116 allows the engine revving device 100 to be easily connected to air when installed in a vehicle by allowing more movement away from the engine revving device 100. The steering wheel clamp 104 securely grips to a variety of steering wheels and, due to the clamp position adjuster 404, can be easily adjusted up or down with a large range of motion based on the vehicle getting serviced. The air coupler 114 doubles as support for the engine revving device 100 as well as to integrate the air into the junction box 110, eliminating the need for additional bulkheads. This allows for all the small air hoses 202 to be kept inside of the junction box 110 and be fully integrated. Flats (e.g., 312) on the air coupler 114 allow for it to be tightened onto the adaptor 304 creating a rigid tool or device. The slotted divider gusset 302, when welded to the junction box 110 after Tab A 502 is matted with Slot A 506 and Tab B 504 is matted with Slot B 508, allows for the linear actuator 108 to be oriented the same each time as well as providing a rigid mount for the junction box 110 and the internals. The metal construction of the junction box 110 protects the internal components from being damaged during general usage. The symmetrical junction box 110 can be installed with the linear actuator 108 extending in either direction allowing the engine revving device 100 to be used on right-hand and left-hand drive vehicles.

In examples, a control unit (e.g., 112) of the present disclosure can include a computing device. The computing device may include a bus that directly or indirectly couples the following devices: memory, one or more central processing units (CPUs), one or more graphics processing units (GPUs), a communication interface, input/output (I/O) ports, input/output components, a power supply, and one or more presentation components (e.g., display(s)).

The bus may represent one or more busses, such as an address bus, a data bus, a control bus, or a combination thereof. The bus may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory may include any of a variety of computer-readable media. The computer-readable media may be any available media that may be accessed by the computing device. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) may be configured to execute the computer-readable instructions to control one or more components of the computing device to perform one or more of the methods and/or processes described herein. The CPU(s) may include any type of processor, and may include different types of processors depending on the type of computing device implemented (e.g., processors with fewer cores for mobile devices and processors with more cores for servers).

The communication interface may include one or more receivers, transmitters, and/or transceivers that enable the computing device to communicate with other computing devices via an electronic communication network, included wired and/or wireless communications.

The I/O ports may enable the computing device to be logically coupled to other devices including the I/O components, the presentation component(s), and/or other components, some of which may be built in to (e.g., integrated in) the computing device. Illustrative I/O components include a microphone, mouse, keyboard, joystick, game pad, game controller, satellite dish, scanner, printer, wireless device, etc.

The power supply may include a hard-wired power supply, a battery power supply, or a combination thereof. The power supply may provide power to the computing device to enable the components of the computing device to operate.

The presentation component(s) may include a display (e.g., a monitor, a touch screen, a television screen, other display types, or a combination thereof), speakers, and/or other presentation components. The presentation component(s) may receive data from other components, and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Subject matter related to a tool or device is described throughout this Specification in detail and with specificity in order to meet statutory requirements. However, this description is not intended to limit the scope of the invention described herein. The aspects described throughout this Specification are intended to be illustrative rather than restrictive. Furthermore, it will be understood that certain features and subcombinations are of utility and may be employed without reference to other features and subcombinations. The claimed subject matter may be embodied and/or practiced in different ways, to include different steps, different combinations of steps, different elements, and/or different combinations of elements, similar or equivalent to those described in this Specification, and in conjunction with other present or future technologies. This is contemplated by, and is within the scope of, the claims. The examples herein are intended in all respects to be illustrative rather than restrictive. In this sense, alternative examples or implementations can become apparent to those of ordinary skill in the art to which the present subject matter pertains without departing from the scope hereof.

What is claimed is:

1. A tool for revving an engine, the tool comprising:

a junction box comprising a divider gusset with a slot, wherein the slot comprises a first shape;

a linear actuator comprising a first threaded connector inserted into the slot, wherein in a cross-section, the first threaded connector includes a second shape corresponding with the first shape;

an adapter coupled to the first threaded connector; and an air coupler coupled to the adapter, the air coupler including a conduit for routing pressurized air from outside the junction box to one or more hoses inside the junction box.

2. The tool of claim 1, wherein the divider gusset comprises a first tab comprising a first length and a second tab having a second length, which is shorter than the first length.

3. The tool of claim 2, wherein the first tab is mated with a first slot and the second tab is mated with a second slot, and wherein the second slot comprises a third length that is a shorter than the first length.

4. The tool of claim 1, wherein a position of the divider gusset is aligned with a midpoint that is about halfway between a first side of the junction box and an opposing second side of the junction box.

5. The tool of claim 1, wherein:

the junction box comprises a first side having a first through hole and a second that is opposite the first side and that comprises a second through hole; and the linear actuator extends through the first through hole and the air coupler extends through the second through hole.

6. The tool of claim 1, wherein the linear actuator is positioned on one side of the divider gusset and the adapter is positioned on the opposing side of the divider gusset.

7. The tool of claim 1, wherein:

the air coupler comprises a first port and a second port;

the first port is positioned outside of the junction box and the second port is positioned inside the junction box; and the conduit fluidly connects the first port and the second port.

8. The tool of claim 7 further comprising, a flexible hose whip coupled to the first port.

9. The tool of claim 1 further comprising, a u-joint connector attaching the linear actuator to a pedal clamp assembly.

10. The tool of claim 1, wherein the one or more hoses fluidly connect the air coupler to the linear actuator.

11. The tool of claim 10, wherein the junction box encloses a pressure regulator in fluid communication with the one or more hoses.

12. The tool of claim 10, wherein the junction box encloses a valve in fluid communication with the one or more hoses.

13. The tool of claim 12, wherein the valve is controlled via a control unit, which is at least partially enclosed by the junction box.

14. A tool for revving an engine, the tool comprising:

a junction box comprising a first side, which comprises a first through opening, and an opposing second side comprising a second through opening;

a linear actuator extending through the first through opening;

an air coupler extending through the second through opening, the air coupler comprising a first port positioned external to the junction box and a second port positioned internal to the junction box; and one or more hoses that are positioned inside the junction box and that fluidly connect the air coupler with the linear actuator, wherein the one or more hoses are fluidly connected with a pressure regulator, which is enclosed within the junction box.

15. The tool of claim 14, wherein the one or more hoses are fluidly connected with a valve, which is enclosed within the junction box.

16. The tool of claim 15, wherein the junction box houses at least a portion of a control unit, which electronically controls one or more operations of the valve.

17. The tool of claim 14, wherein the first port is coupled to a hose whip.

18. The tool of claim 14, wherein the junction box comprises a divider gusset, which is positioned between at least a portion of the air coupler and the linear actuator.

19. The tool of claim 18, wherein the divider gusset comprises a slot, and wherein the linear actuator comprises a threaded connector that is inserted into the slot.

* * * * *